United States Patent [19]

Irio et al.

[11] Patent Number: 4,648,157
[45] Date of Patent: Mar. 10, 1987

[54] METHOD OF ASSEMBLY OF THE SHELL WITH THE BAND OF A CLAMPING COLLAR, AND COLLARS OBTAINED BY THIS METHOD

[75] Inventors: Francis Irio, Chabris; Richard Chene, Mennetou-sur-Cher; Pierre Uzac, Romorantin Lanthenay, all of France

[73] Assignee: Etablissements Caillau, France

[21] Appl. No.: 587,256

[22] Filed: Mar. 7, 1984

[30] Foreign Application Priority Data

Mar. 10, 1983 [FR] France ................. 83 03945

[51] Int. Cl.⁴ ............................................. B65D 63/06
[52] U.S. Cl. ..................................... 24/23 R; 24/23 W
[58] Field of Search ............... 24/23 B, 274 R, 21, 24/23 W, 20 TT

[56] References Cited

U.S. PATENT DOCUMENTS

| | | | |
|---|---|---|---|
| 550,292 | 11/1895 | Roberts | 24/21 |
| 1,546,370 | 7/1925 | Dietze | 24/23 W |
| 2,192,979 | 3/1940 | McAneny, Jr. | 24/23 B |
| 2,533,275 | 12/1950 | McAneny | 24/23 B |
| 3,067,640 | 12/1962 | Lodholm | 24/23 W |
| 4,103,637 | 8/1978 | Luc | 24/274 R X |
| 4,237,588 | 12/1980 | Rasmussen et al. | 24/274 R |
| 4,319,385 | 3/1982 | Marchou | 24/20 TT X |
| 4,418,448 | 12/1983 | Sauer | 24/20 TT |

Primary Examiner—Peter A. Aschenbrenner
Attorney, Agent, or Firm—Darby & Darby

[57] ABSTRACT

Method of assembly of the shell with the strap of a clamping collar, and collars obtained with this method.

This method consists in fixing the strap under the shell of the collar and no longer by passage inside the latter. With this in mind the shell (7) has, in the part forming its base (8), cut-outs preferably forming two tongues provided between remaining parts of the base. These tongues are cranked and the shell is fitted over the strap in a straddling position. The tongues are then flattened, the force applied preferably causing the corresponding strap portion (2) to penetrate by bending into the opening thus formed in the base of the shell. A non-slip bond is obtained between the shell and the strap owing to raised parts of the strap penetrating into the cut-out or opening in the base of the shell and forming immobilization stops. The invention also relates to the clamping collars thus obtained and a method of locking a collar in clamped position which consists in bending the strap portion emerging from the shell just beyond the latter, utilizing the space formed as a result of the fixation of the strap under the collar shell.

20 Claims, 9 Drawing Figures

METHOD OF ASSEMBLY OF THE SHELL WITH THE BAND OF A CLAMPING COLLAR, AND COLLARS OBTAINED BY THIS METHOD

The present invention relates in a general way to clamping collars of the type commonly used to connect piping, to fix, for example, a pipe onto a nipple, or for similar applications.

It relates more particularly to clamping collars of the type involving a metal strap that surrounds the element to be held, and equipped near one end with a shell into which the other end of the strap made to surround this element is inserted, means being provided to immobilize this other end of the strap relative to the shell once the clamping is completed. These means are generally constituted by profiles or ridges provided, on the one hand on the strap, at least in the vicinity of the end engaged through the shell in the clamping operation, and on the other hand inside the shell itself. The embodiment of such profiles or ridges complicates the manufacture of the collar and consequently increases its cost price. In addition there is the resulting presence of discontinuities, reliefs or hollows in the surface of the strap that is applied against the element to be clamped, for example against the pipe, increasing the friction in the last stages of the clamping.

There have already been proposals to lock such collars in clamped position by a mutual bending of the shell and the strap engaged in the latter by means of a punch struck with a hammer (BAND-IT-HOUDAILLE Collar). This avoids the necessity of providing profiles or ridges in the strap and shell as indicated above, but the locking of the collar then requires the bending of the strap and the shell at the same time, hence a non-negligible force or impact which, since it is exerted directly over the pipe as it is applied to the shell can lead to the rupture of a nipple, of plastic, for example, on which the pipe is fitted.

It is the aim of the invention to create a method for assembling the shell with the strap of a clamping collar of this type under conditions that provide, in the zone where the section of free strap emerges from the shell, sufficient space to be able to insure at this point, the bending of the collar strap to lock it. In so doing the advantages resulting from the use of a smooth collar strap, to wit a lower cost price and a better application of the strap against the pipe, with less friction of the strap both on the pipe and in the shell, are retained, without the drawbacks resulting from the application of an impact directly on the collar shell.

It is common, in clamping collars of the type considered by the invention, to embody the integration of the shell and the strap by passage of the strap inside the shell. Means are then provided to retain the shell on the strap longitudinally to the latter. These means can be constituted for example by bosses on the base of the shell, immobilizing the latter on the strap. Also known is the formation by cutting in the base of the shell of a barrette forming a passage opening for the strap. This barrette is then driven toward the plane of the base of the shell after engagement of the strap, to bend the latter and thus embody the required integration. The bond obtained is, however, a slipping bond that does not establish an absolute locking of the two pieces.

This method of assembly also has the consequence of a weak engagement between the section of strap bearing the shell and the free section emerging from the latter, which interferes with the desired bending of the strap by means of an appropriate tool, without impact on the shell and without transmission of a shock to the element surrounded by the collar.

The invention is materialized in one of its aspects in a method of assembly of the shell with the strap of a clamping collar, characterized by the formation by cutting, in the part forming the base of the shell, of at least one flattenable tongue edged on either side by parts of this shell base, this tongue is raised, the shell is fitted by its base on the collar strap and the said tongue is flattened under this strap, preferably by applying a bending force to drive the part of the strap placed at the position of the said tongue between the remaining parts of the shell base.

According to a preferred method of embodiment, two tongues are cut out in the base of the shell, these tongues being separated from one another in the longitudinal median plane of the shell, these tongues being raised and the shell being placed on the strap in a straddling relationship with the latter, with a view to flattening the said tongues under this strap.

Thus the strap is no longer engaged inside the shell, but is fixed under the latter in a manner that permits good automation of the assembly process.

The fixation is insured by the bending of the strap, which penetrates between the remaining parts of the base of the shell.

This method of assembly provides, as indicated, as a result of the fixation of the strap under the shell, a clear space between the strap section bearing the shell and its free end, to accommodate a tool for bending, after the collar is clamped around the element or pipe, the strap portion that is just beyond the shell close to its free end, in a manner thereby embodying the locking of the collar in clamped position without having to act on the shell itself by impact, with the drawbacks mentioned above.

According to another feature, there is, in the strap portion which is to receive the shell, on either side of this strap, a slightly raised zone or ear, formed by notching the edges of the strap. These ears, in assembled position, penetrate into the cutout formed in the base of the shell, so that they constitute free stops which, by pressing on either side against the edges of this cutout, counteract any longitudinal displacement of the shell relative to the strap, thereby embodying an absolutely non-slip bond between these pieces.

Moreover, these raised parts or ears serve to position the shell on the strap and aid the flattening of the tongues of the shell under this strap.

The embedment thus embodied of the assembly formed by the bent part of the strap and the tongues in the cutout of the base of the shell also permits the obtention, while completing the required bond, of a lower profile that is as even as possible with no sharp relief to interfere with the seal.

The invention also relates, in another aspect, to clamping collars of the general type in question, in which the shell is assembled with the strap by the method described.

And the invention relates, in still another aspect, to a method of locking in clamped position, of a collar of the type described above, which consists in bending the strap section emerging from the shell just beyond this shell to prevent the withdrawal of the strap from the collar and thus embody the required locking in clamped condition, by utilizing the space formed between the sections of strap in the vicinity of the shell, owing to the fixation of the collar strap under this shell, to accommodate a bending tool.

The following description given in connection with the attached drawings, in nonlimiting fashion, will permit a better comprehension of the invention.

Figure 1:
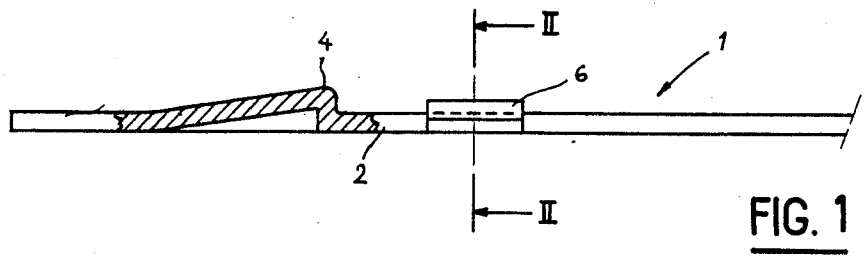
FIG. 1 is a profile view, partly in section, of the terminal part of a collar strap which is to receive a shell.

In the drawings, reference 1 is used to designate in a general fashion the clamping collar strap, whereof the end which is to receive the shell is designated by 2, and its other end, engaged in the shell after surrounding the element or object to be clamped, is designated by 3.

Examination of FIG. 1 reveals that the end 2 of strap 1, in the part forming a "bib", has been profiled so as to form a boss 4, known in itself, constituting a supporting ramp for the strap to facilitate its entry into the shell and prevent entry "breakage" that would interfere with the performance of the collar.

Figure 2:
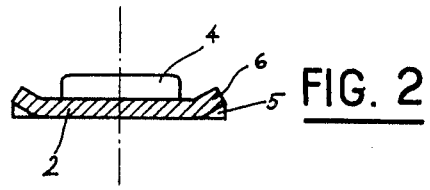
FIG. 2 is a view in cross section through line II—II in FIG. 1.

Two notches were formed, as indicated at 5 (FIG. 2), on either side of strap 1, in the part which is to receive the shell, over a small part of the width of this strap, in order to form two ears which are raised relative to the plane of the strap, as can be seen in particular at 6 in FIG. 2. The purpose of these ears will appear below.

Figure 9:
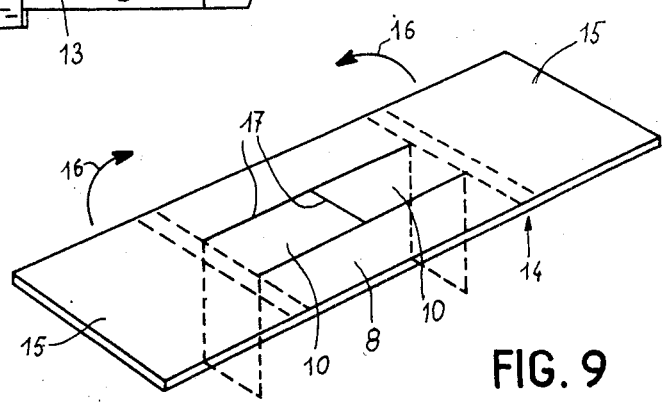
FIG. 9 is a perspective view of a metal sheet used to form the shell.

The shell, designated as a whole by reference 7, is formed from a metal sheet or strip 14 (FIG. 9) of appropriate thickness, which is to be flattened on itself by its marginal parts 15, as indicated by arrows 16, to form a shell base 8 (figure 3) and a top part 9 in which the two edges of the sheet 14 forming the shell come together on the median longitudinal axis of this shell.

According to the invention, cutouts are made in the part of sheet 14 forming the base 8 of the shell, making two tongues 10 facing one another. With this in mind, this part of the sheet forming the base of the shell is notched along the H-shaped lines 17, making two lateral parts in the base of the shell. The tongues 10 thus formed are then cranked downward relative to this base 8 (as indicated in dotted lines in FIG. 9), forming a cutout or opening therein.

Figure 6:
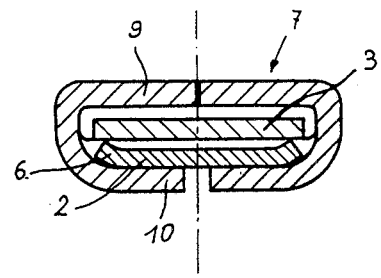
FIG. 6 is a cross-sectional view through line VI—VI in FIG. 3.

In this condition the preformed shell can be fitted over the part 2 of the strap 1 which is to receive, at the position of the ears 6, the shell which thus straddles the strap, being positioned by these ears 6. When this condition has been obtained, the tongues 10 are flattened under the strap 1, which is thus applied under shell 7. The inclined ears 6 assist this flattening of the tongues as clearly seen in figure 6. The force of flattening is calculated so that the part of strap 1 which is at the position of the ears 6, between the two remaining parts of the base 8 situated on either side of the tongues, will be bent and driven into the cutout formed between these remaining parts, as seen in FIG. 3.

In this condition the ears 6 of the strap are held between the edges of the cutout formed in the base of the shell and constitute free stops providing an absolutely non-slip bond between the shell and the strap.

Figure 4:
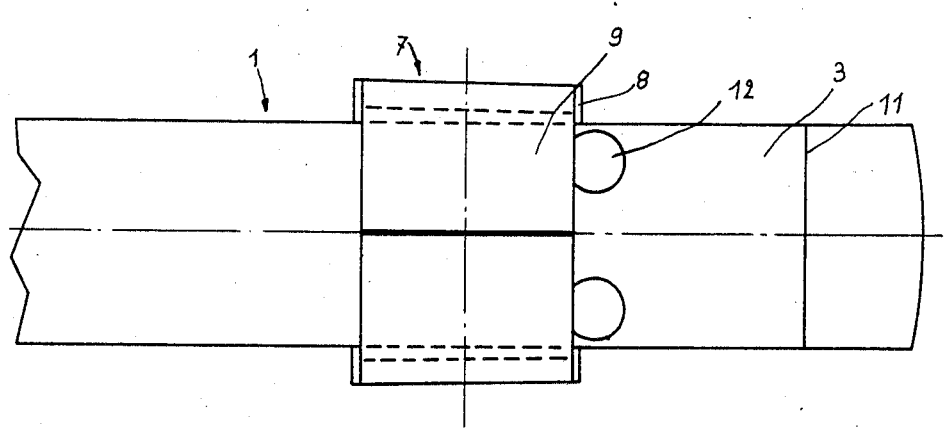
FIG. 4 is a view from above corresponding to FIG. 3.
Figure 5:
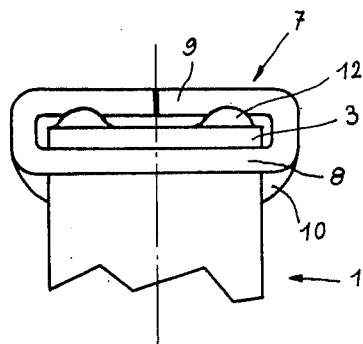
FIG. 5 is an end view corresponding to FIG. 3.

It will be noted, moreover, that as tongues 10 are flattened, the remaining parts of the base 8 of the shell are separated from one another somewhat, which aids the penetration of the strap into the cutout in this shell base with no shearing effect of this strap. This separation of the remaining parts of the base 8 of the shell can be seen particularly well in the plan view formed by FIG. 4.

Figure 3:
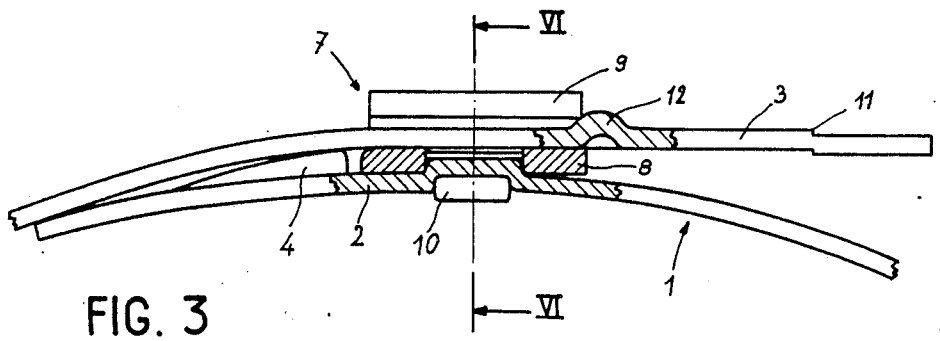
FIG. 3 is a profile view, partly in section, showing the shell fixed on the collar strap, the free end of this strap being engaged in the shell after surrounding an element or object.
Figure 7:
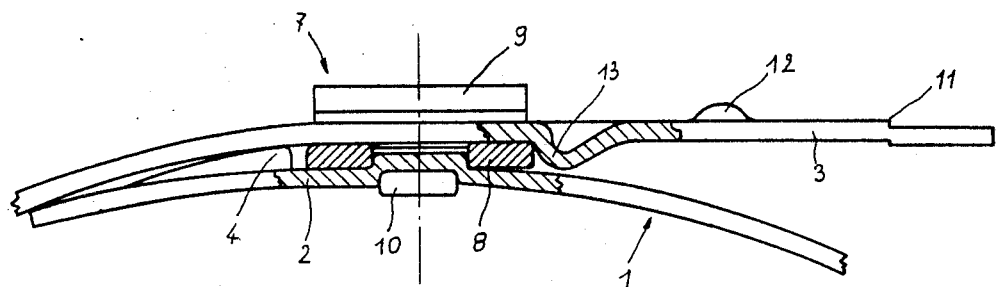
FIG. 7 is a view similar to FIG. 3, but showing the part of the collar involved after the latter is locked in clamped position by bending the strap.
Figure 8:
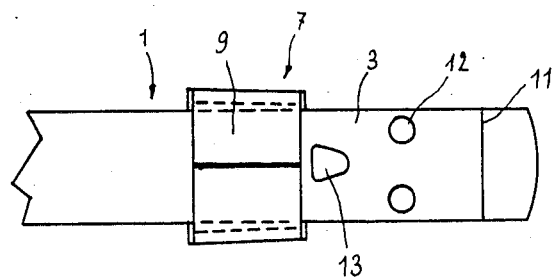
FIG. 8 is a plan view corresponding to FIG. 3.

FIGS. 3 and 7 show that, as a result of this method of assembly of the shell, which permits the fixation of the collar strap under this shell, and aside from the clamping of the collar between the strap section disposed just behind shell 7 and the strap section emerging from this shell, sufficient space is obtained to insure the locking in place of the collar by bending the strap as indicated below.

It will first of all be noted that in the method of embodiment represented, the part 3 of the strap has an offset 11 which is provided to accommodate a traction tool to insure the clamping of the collar around the element or object. Two bosses 12 are likewise provided to prevent the escape of this part 3 of the strap 1 relative to the shell. In the condition represented in FIG. 3, the collar is "open" along its maximum diameter and it is engaged in this position on the element or object to be clamped. The presence of these bosses 12 avoids having to rethread the strap into the shell when the collar has been fitted around the element or object.

When the required degree of clamping has been reached, part 3 of the strap 1 of the collar is then bent as indicated at 13 in FIG. 7, locking the collar in clamped position. The bending obtained actually counteracts the withdrawal of the collar in the shell.

It is obvious from a perusal of the foregoing that the assembly process described, by forming, as indicated, an adequate free space for the accommodation of a tool just back of the shell, owing to the position of the strap under the shell in the assembled condition, permits the locking of the collar by bending as described, and hence the use of smooth collars devoid of the usual locking profiles or ridges with the advantages deriving therefrom as indicated above.

We claim:

1. A method for manufacturing a clamp for pipes, said clamp being comprised of a metallic strap having first and second ends, and an elongated buckle blank having base means for securing said blank transversely on said first end of said strap, said buckle blank including at least one end part projecting from said base transversely of said strap and foldable over said base to form a channel defining, in combination with said base, slot means adapted to receive said second end of said strap, said method comprising the steps of:

cutting said buckle blank base to form at least one elongated tongue portion therein, said tongue extending transversely with respect to said strap when said base is secured thereto;

folding said tongue to a position where said tongue is substantially perpendicular to said base, thereby providing in said base an open recess of a shape corresponding to said tongue, said recess having first and second substantially parallel sides extending transversely with respect to said strap when secured to said buckle base; and fitting said buckle base over said first end of said strap, folding said tongue beneath said strap and applying on said tongue forces whereby said first end is caused to deform and engage into said open recess and to come into contact with said recess sides, whereby said sides act as longitudinal stops preventing longitudinal movement of said strap with respect to the buckle blank.

2. The method according to claim 1 in which said cutting step includes cutting in said base two substantially identical tongues facing one another, said tongues being folded and secured beneath said strap.

3. The method according to claims 1 or 2, further comprising, prior to the step of fitting said base over said strap, the step of providing at least one longitudinal edge of said strap with a longitudinally extending raised portion defining a raised ear, the longitudinal length of said ear being substantially equal to the distance between said parallel first and second sides of said recess in said base, whereby terminal longitudinal extremes of said ear constitute stops engaged with said recess sides to improve longitudinal securing of said strap and said buckle blank.

4. The method according to claim 3 wherein said longitudinal edge of said strap is first notched to form said terminal extremes of said ear and is subsequently bent and raised to have a bevelled orientation with respect to said strap.

5. The method according to claims 1 or 2 further comprising the steps of stamping out a boss in the terminal portion of said first end of said strap beyond the buckle blank and shaping said boss to constitute a ramp terminating near said buckle blank base, thereby facilitating engagement of said second end into said slot means of said buckle blank.

6. the method according to claim 3 further comprising the steps of stamping out a boss in the terminal portion of said first end of said strap beyond said buckle blank, and shaping said boss to constitute a ramp terminating near said buckle base, thereby facilitating engagement of said second end into said slot mean of said buckle blank.

7. A clamp for pipes comprised of:
a metallic strap having first and second ends;
a buckle blank having a base secured on said first end of said strap and means defining a channel for receiving said second end of said strap;
said strap first end having a transverse deformed portion defining a raised region on an outwardly directed surface of said first end and a corresponding recessed region on an inwardly directed surface of said first end;
at least one tongue formed in said buckle blank base to extend transversely with respect to said strap and to provide in said base an opening of a shape corresponding to said raised region of said first end, said tongue extending beneath said strap and within said recessed region in said first end of said strap.

8. The clamp according to claim 7 further comprising a second tongue facing said first tongue and secured beneath said strap.

9. The clamp according to claims 7 or 8 wherein said strap includes a raised portion defining an ear on at least one of its longitudinal edges the longitudinal length of said ear being substantially equally to the extent of said opening along said strap, said ear having terminal longitudinal portions which constitute stops engaging with said sides of said base defining said opening to improve longitudinal securing of the strap and said buckle blank.

10. The clamp according to claim 9 wherein said longitudinal edges of said strap include notches to form said terminal portions of said ear which are bent and raised to have a beveled orientation with respect to said strap.

11. The clamp according to claims 7 or 8 wherein the terminal portion of said first end of said strap ahead of the buckle blank includes a boss constituting a ramp terminating near said buckle blank base.

12. The clamp according to claim 9 wherein the terminal portion of said first end of said strap ahead of the buckle blank includes a boss constituting a ramp terminating near said buckle blank base.

13. A method for locking a clamp comrised of a metallic strap having first and second ends, and an elongated buckle blank having a base securing said blank transversely on said first end of said strap and comprising at least one end part projecting from said base transversely of said strap and foldable over said base to form a channel defining, in combination with said base, slot means adapted to receive said second end of said strap, at least one tongue cut in said buckle blank base extending transversely with respect to said strap, said tongue being cut in said base to provide in said base an open recess of a shape corresponding to said tongue, said recess having first and second substantially parallel sides extending transversely with respect to said strap and said buckle base being fitted over said first end of said strap with said tongue beneath said strap, said first end of said strap being formed and engaged into said open recess to come into contact with said recess sides which act as longitudinal stops preventing longitudinal movement of said strap with respect to the buckle blank, said method comprising the steps of bending of a part of said second end of said strap to form a boss after tightening of said clamp where said second end just emerges from said slot means of said buckle blank.

14. The method according to claim 13 in which said claim includes two substantially identical tongues secured beneath said strap.

15. The method according to claims 13 or 14 wherein said strap is provided on at least one of its longitudinal edges with a raised portion defining a raised ear the longitudinal length of which is substantially equal to the distance between said parallel first and second sides of said recess in said base whereby terminal longitudinal portions of said ear constitute stops engaging with said recess sides to improve longitudinal securing of said strap in said buckle blank.

16. The method according to claims 13 or 14 wherein said first end of said strap ahead of said buckle blank includes a boss in the terminal portion thereof constituting a ramp terminating mean said buckle blank base.

17. The method according to claim 15 wherein said first end of said strap ahead of said buckle blank includes a boss in the terminal portion thereof constituting a ramp terminating mean said buckle blank base.

18. The method according to claim 15 wherein said longitudinal edge of said strap includes notches to form terminal portions of said ear which portions are bent and raised to have a bevelled orientation, with respect to said strap.

19. The method according to claim 4 further comprising the steps of stamping out a boss in the terminal portion of said first end of said strap beyond the buckle blank and shaping said boss to constitute a ramp terminating near said buckle blank base, thereby facilitating engagement of said second end into said slot means of said buckle blank.

20. A clamp in accordance with claim 7 wherein said second end of said strap includes boss means enlarging the size of a portion of said second end beyond the size of said channel, thereby preventing said strap from escaping out of said channel of said buckle blank.

* * * * *